United States Patent
EL-Jawahri et al.

(10) Patent No.: US 11,958,431 B1
(45) Date of Patent: Apr. 16, 2024

(54) ASSEMBLY INCLUDING OVERHEAD AIRBAG AND KNEE AIRBAG

(71) Applicant: Ford Global Technologies, LLC, Dearborn, MI (US)

(72) Inventors: Raed Essa EL-Jawahri, Northville, MI (US); Marcos Silva Kondrad, Macomb Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/060,222

(22) Filed: Nov. 30, 2022

(51) Int. Cl.
| B60R 21/233 | (2006.01) |
| B60R 21/207 | (2006.01) |
| B60R 21/21 | (2011.01) |
| B60R 21/231 | (2011.01) |
| B60R 21/2338 | (2011.01) |

(52) U.S. Cl.
CPC .......... *B60R 21/233* (2013.01); *B60R 21/207* (2013.01); *B60R 21/21* (2013.01); *B60R 21/231* (2013.01); *B60R 21/2338* (2013.01); *B60R 2021/23107* (2013.01); *B60R 2021/23161* (2013.01); *B60R 2021/23169* (2013.01); *B60R 2021/23308* (2013.01); *B60R 2021/23382* (2013.01)

(58) Field of Classification Search
CPC .......... B60R 2021/23107; B60R 2021/23169; B60R 21/233; B60R 21/207; B60R 21/21; B60R 21/231; B60R 2021/23161; B60R 2021/23308
See application file for complete search history.

(56) References Cited

U.S. PATENT DOCUMENTS

| 6,398,254 | B2 | 6/2002 | David et al. |
| 10,525,922 | B1 | 1/2020 | Lin et al. |
| 10,625,704 | B2 * | 4/2020 | Dry ...................... B60R 21/207 |
| 11,358,558 | B2 | 6/2022 | Fischer et al. |
| 2017/0210329 | A1 | 7/2017 | Rao et al. |
| 2019/0161045 | A1 | 5/2019 | Thomas et al. |

* cited by examiner

*Primary Examiner* — Keith J Frisby
(74) *Attorney, Agent, or Firm* — Frank A. MacKenzie; Bejin Bieneman PLC

(57) ABSTRACT

An assembly for a vehicle includes a vehicle body having a body side. A seat is adjacent the body side. The seat includes a seatback and a seat bottom extending in a seat-forward direction from the seatback. The seatback and seat bottom defines an occupant-seating area. A head airbag is mounted to the seatback and is inflatable over the occupant-seating area. A knee airbag is mounted to the body side. The knee airbag is inflatable from the body side to an inflated position. The knee airbag in the inflated position is adjacent to the seat bottom in the seat-forward direction from the seat bottom.

14 Claims, 7 Drawing Sheets

ASSEMBLY INCLUDING OVERHEAD AIRBAG AND KNEE AIRBAG

BACKGROUND

Vehicles are equipped with airbag assemblies that include an airbag and an inflator. In the event of certain vehicle impacts, the inflator activates and provides inflation medium to the airbag. This pressurizes the airbag to control the kinematics of an occupant during certain vehicle impacts. The airbag assemblies may be located at various positions in the passenger compartment of the vehicle. Vehicles may include airbags supported on a dash, side air curtains mounted to roof rails, seat-mounted airbag, etc.

DETAILED DESCRIPTION

Figure 1:
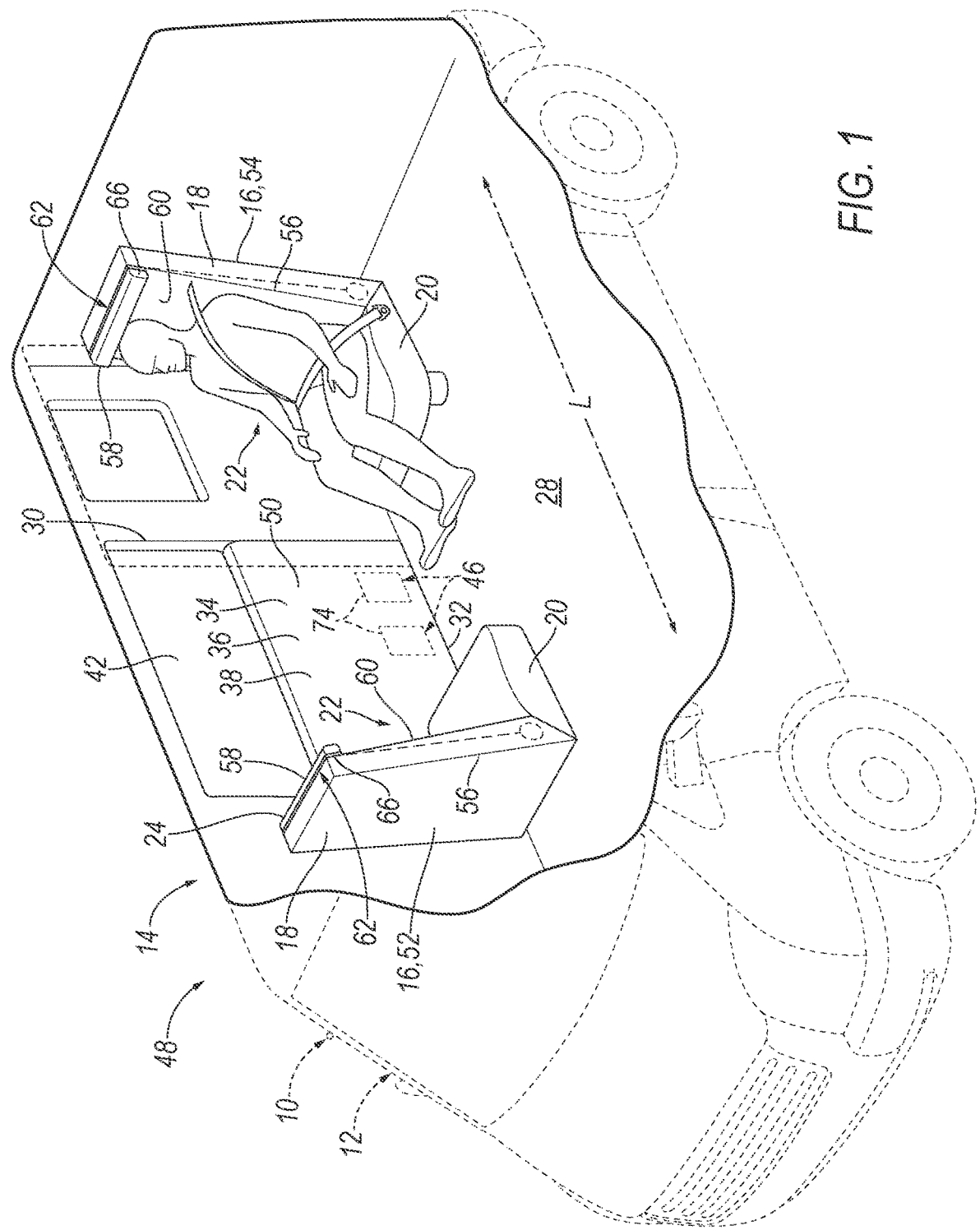
FIG. 1 is a cut-away perspective view of a vehicle having a passenger compartment with airbags in an uninflated position.

An assembly for a vehicle includes a vehicle body having a body side. A seat is adjacent the body side. The seat includes a seatback and a seat bottom that extends in a seat-forward direction from the seatback. The seatback and seat bottom defines an occupant-seating area. A head airbag is mounted to the seatback and is inflatable over the occupant-seating area. A knee airbag is mounted to the body side. The knee airbag is inflatable from the body side to an inflated position. The knee airbag in the inflated position is adjacent the seat bottom in the seat-forward direction from the seat bottom.

The body side may include a door. The knee airbag may be mounted to the door. The body side may include a door opening frame and the door slides relative to the door opening frame between an open position and a closed position.

The vehicle body may include a longitudinal centerline. The seat may be between the longitudinal centerline and the body side. The assembly may include a second seat including a seat bottom and a seatback extending upwardly from the seat bottom. The second seat may be between the longitudinal centerline and the body side. The knee airbag inflates in a cross-vehicle direction from the body side to the inflated position between the seat and the second seat.

The assembly may include a second knee airbag. The knee airbag may be fluidly connected to the second knee airbag.

The head airbag may include a top chamber inflatable above the occupant-seating area. The head airbag may be mounted to the seatback. The head airbag may include two side chambers inflatable downwardly from the top chamber on opposite sides of the occupant-seating area.

An assembly for a vehicle body includes a body side. A first seat and a second seat are adjacent the body side. One of the first seat and the second seat is vehicle-forward of the other of the first seat and the second seat. The first seat and the second seat each includes a seat bottom, a seatback extending upwardly from the seat bottom, and an occupant-seating area defined by the seat bottom and the seatback. A head airbag is mounted to the seatback of the first seat and inflatable over the occupant-seating area of the first seat. A knee airbag is mounted to the body side and is inflatable from the body side to an inflated position. The knee airbag in the inflated position is between the seat bottom of the first seat and the seat bottom of the second seat.

The assembly may include a second knee airbag mounted to the body side and inflatable from the body side to an inflated position. The second knee airbag in the inflated position may be between the seat bottom of the first seat and the seat bottom of the second seat. The knee airbag in the inflated position may be adjacent to the second knee airbag in the inflated position. The knee airbag in the inflated position abuts the second knee airbag in the inflated position. The knee airbag and the second knee airbag may be fluidly connected.

The assembly may include a second head airbag mounted to the seatback of the second seat and inflatable over the occupant-seating area of the second seat. The head airbag mounted to the seatback and the second head airbag mounted to the seatback include a top chamber inflatable above the occupant-seating area. The head airbag mounted to the seatback and the second head airbag mounted to the seatback may include two side chambers inflatable downwardly from the top chamber on opposite sides of the occupant-seating areas.

With reference to the Figures, wherein like numerals indicate like parts throughout the several views, an assembly 48 for a vehicle 10 includes a vehicle body 12 having a body side 14. A seat 16 is adjacent the body side 14. The seat 16 includes a seatback 18 and a seat bottom 20 that extends in a seat-forward direction from the seatback 18. The seatback 18 and seat bottom 20 defines an occupant-seating area 22. A head airbag 24 is mounted to the seatback 18 and is inflatable over the occupant-seating area 22. A knee airbag 26 is mounted to the body side 14. The knee airbag 26 is inflatable from the body side 14 to an inflated position. The knee airbag 26 in the inflated position is adjacent the seat bottom 20 in the seat-forward direction from the seat bottom 20.

Since the head airbag 24 is mounted to the seatback 18 of the seat 16, the head airbag 24 in the inflated position is positioned to control the kinematics of an occupant of the seat 16. Since the knee airbag 26 is inflated to the inflated position in front of the legs of the occupant, the knee airbag 26 in the inflated position is positioned to control the kinematics of an occupant of the seat 16. Specifically, the head airbag 24 and the knee airbag 26 work in conjunction in the event of certain vehicle impacts to control the kinematics of the legs of the occupants and to control the kinematics of the occupant in an upright position.

The vehicle 10 may be any suitable type of automobile, e.g., a passenger or commercial automobile such as a sedan, a coupe, a truck, a sport utility, a crossover, a van, a minivan, a taxi, a bus, etc. The vehicle 10, for example, may be autonomous. In other words, the vehicle 10 may be autonomously operated such that the vehicle 10 may be driven without constant attention from the driver, i.e., the vehicle 10 may be self-driving without human input.

With reference to FIG. 1, the vehicle 10 defines a vehicle-longitudinal centerline L extending between a front end (not numbered) and a rear-end (not numbered) of the vehicle 10. The vehicle 10 defines a cross-vehicle axis extending cross-vehicle from one side to the other side of the vehicle 10. The vehicle 10 defines a vertical axis extending through the floor 28 and a roof (not numbered) of the vehicle 10. The vehicle-longitudinal centerline L, the cross-vehicle axis, and the vertical axis are perpendicular relative to each other.

The vehicle 10 includes a vehicle frame. The vehicle frame may be of a unibody construction in which the frame is unitary with a vehicle body 12 (including frame rails, pillars, roof rails, etc.). As another example, the body and frame may have a body-on-frame construction (also referred to as a cab-on-frame construction) in which the body and frame are separate components, i.e., are modular, and the body is supported on and affixed to the frame. Alternatively, the frame and body may have any suitable construction. The frame and body may be of any suitable material, for example, steel, aluminum, and/or fiber-reinforced plastic, etc.

The vehicle body 12 defines a passenger compartment (not numbered) to house occupants, if any, of the vehicle 10. The passenger compartment may extend across the vehicle 10, i.e., from one side to the other side of the vehicle 10. The passenger compartment includes a front end and a rear end with the front end being in front of the rear end during forward movement of the vehicle 10.

With reference to the Figures, the vehicle body 12 has the body side 14. Specifically, the vehicle body 12 includes two body sides 14 spaced cross vehicle from each other. The body side 14 is a side of the body located vehicle-outboard of the passenger compartment. The body side 14 includes one or more door openings (not numbered), i.e., a front door opening, a rear door opening, etc. A floor 28 of the vehicle 10 extends from one body side 14 to the other body side 14 and the roof of the vehicle 10 extends from one body side 14 to the other body side 14.

The vehicle body 12, specifically, each body side 14, may include pillars (not numbered). The pillars may extend from the roof to the floor 28. Specifically, the vehicle body 12 may include pillars on both sides of the vehicle 10. The pillars on the same body side 14 are separated by one of the door openings. In the example shown in the Figures, each side of the vehicle 10 includes a front pillar, a middle pillar, and a rear pillar. The front pillars may extend between the windshield and the front door openings. In other words, the front pillars may be disposed at the front end of the interior cabin. The middle pillars may extend between the front door opening and the rear door opening, i.e., between adjacent door openings. The vehicle 10 may include additional pillars.

The body side 14 includes at least one door opening frame (not numbered) and at least one door 30 in each door opening frame. The door opening frame is between the pillars and/or hinge pillars and is between the roof and a sill 32. The door 30 is openable for occupants to enter and exit the passenger compartment. As an example, as shown in the example in Figures, the door 30 may slide relative to the door opening frame between an open position and a closed position. In such an example, the door opening frame may include a track in which the door 30 slides between the open and closed position, e.g., by motorized operation. The track, for example, may be of a type currently known in the art. In other examples, the door 30 may be hinged to the door opening frame such that the door 30 may rotate from between the open and closed positions.

Each door 30 includes at least one door panel 34 and the door trim panel 36 supported on the door panel 34. Specifically, the door panel 34 may include a door inner 38 and a door outer 40. In such an example, the door trim panel 36 and the door outer 40 are fixed to the door inner 38. The door trim panel 36 is positioned opposite the door outer 40 relative to the door inner 38. The door trim panel 36 is inboard relative to the door inner 38, and the door outer 40 is outboard relative to the door inner 38. The door 30 includes a window opening 42 that may be completely closed by a window (not numbered) when the window is in a fully raised position. The window opening 42 is defined by the door trim panel 36 and door outer 40 on a bottom edge and either by the door inner 38 circumscribing the window opening 42 or by the vehicle body 12, e.g., by vehicle pillar and roof rail. The door outer 40 faces outboard relative to the vehicle 10.

The door panel 34, e.g., the door inner 38 and/or door outer 40 may be metal (such as steel, aluminum, etc.) or polymeric (such as fiber reinforced plastic composite, etc.). The door inner 38 provides structural rigidity for the door outer 40. The door inner 38 may provide a mounting location for components of the door 30. A knee airbag assembly may be fixed to the door inner 38.

The door trim panel 36 may include a covering 50. The covering 50 may include upholstery, padding, etc. The upholstery may be cloth, leather, faux leather, or any other suitable material. The upholstery may be stitched panels. The padding may be foam or any other suitable material. The door trim panel 36 may be a material suitable for an interior of the vehicle 10, such as vinyl, plastic, leather, wood, etc.

The vehicle 10 includes at least two seats 16. In the example shown in the Figures, two seats 16 are shown, namely a first seat 16, 52 and a second seat 16, 54, where the numerical adjectives, e.g., "first," and "second," are used herein merely as identifiers and do not signify order or importance. The vehicle 10 may include other seats 16 not shown in FIGS. 1-3 to illustrate the first seat 16, 52 and second seat 16, 54 on those Figures. The seats 16 may be arranged in the passenger compartment in any suitable position, i.e., as front seats 16, rear seat, third-row seats 16 etc. The seat 16 may be movable relative to the floor 28 to various positions, e.g., movable fore-and-aft and/or cross-vehicle. The seats 16 may be of any suitable type, e.g., a bucket seat 16 as shown in FIG. 1.

Each seat 16 may be rotatable. In other words, each seat 16 may rotate about the vertical axis that extends through the roof and the floor 28. For example, each seat 16 may rotate between a forward-facing position, a rearward-facing position, a rightward-facing position, a leftward-facing position, and/or positions therebetween. Each seat 16 may rotate completely, i.e., 360°, about the vertical axis. Each seat 16 may rotate between fixed positions, e.g., the forward-facing position and the rearward-facing position, or may be rotatable to an infinite number of positions.

The vehicle body 12 includes a longitudinal centerline L, the longitudinal centerline extends between the front end and rear end of the vehicle 10. The longitudinal centerline is parallel with the vehicle-longitudinal centerline L. In the example shown in the Figures, both the first seat 16, 52 and second seat 16, 54 are between the longitudinal centerline L and one of the body sides 14. In examples including more seats 16, another first seat 16, 52 and another second seat 16, 54 may be between the longitudinal centerline L and the other of the sides.

Figure 2:
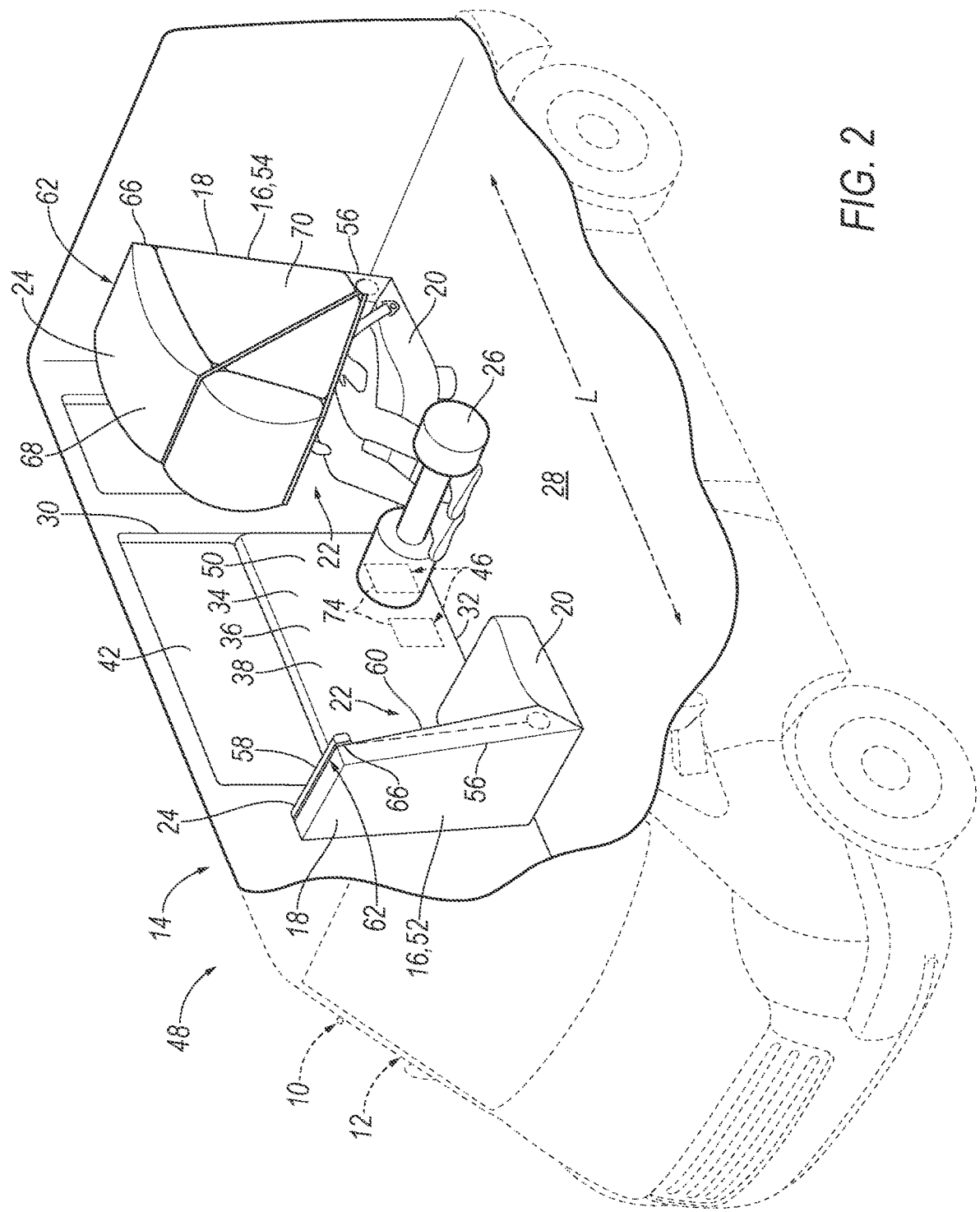
FIG. 2 is a cut-away perspective view of the vehicle with a head airbag assembly and a knee airbag assembly in an inflated position.
Figure 3:
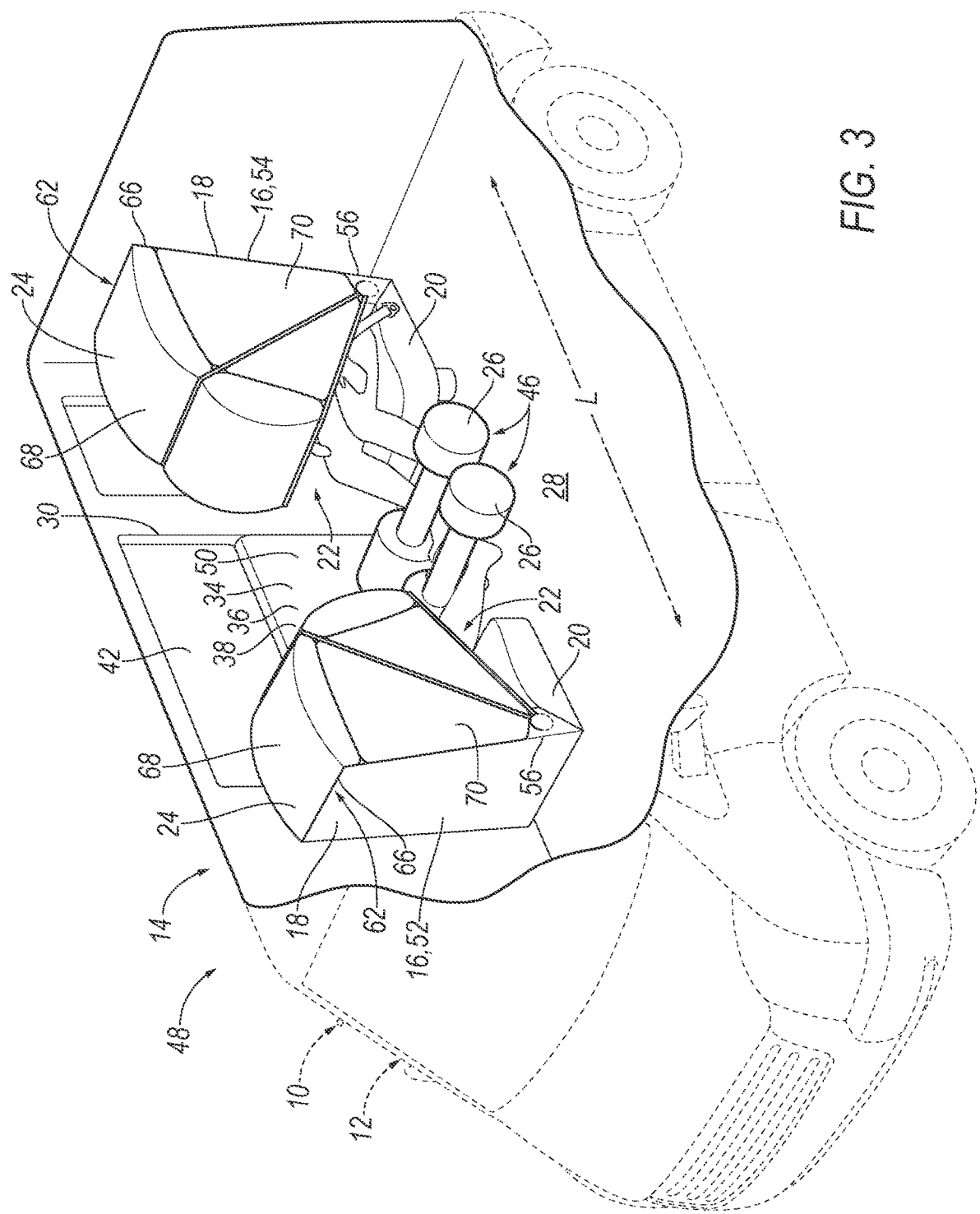
FIG. 3 is a cut-away perspective view of the vehicle with a head airbag assembly and a knee airbag assembly for two seats in the inflated position

With continued reference to FIGS. 1-3, the two seats 16 are adjacent the body side 14, i.e., with nothing between the two seats 16 and the body side 14. Specifically, the seats 16 are between the body side 14 and the longitudinal center line. In other words, the seats 16 are on the same side of the longitudinal centerline L. In some examples such as the example shown in the Figure, the seats 16 are aligned cross vehicle with each other. With continued reference to FIG. 1, one of the seats 16 is vehicle-forward of the other seat 16. In the examples shown in the figures, the seats 16 are aligned with each other along an axis parallel to the longitudinal centerline L.

The seat 16 includes the seatback 18 and the seat bottom 20. The seatback 18 may be supported by the seat bottom 20 and may be stationary or movable relative to the seat bottom 20. Specifically, the seatback 18 extends upwardly from the seat bottom 20. The seatback 18 and the seat bottom 20 may be adjustable in multiple degrees of freedom. Specifically, the seatback 18 and the seat bottom 20 may themselves be adjustable, in other words, adjustable components within the seatback 18 and/or the seat bottom 20, and/or may be adjustable relative to each other.

The seat bottom 20 extends in a seat-forward direction from the seatback 18. Specifically, the seat bottom 20 may be elongated from the seatback 18 in the seat-forward direction. In other words, the longest dimension of the seat bottom 20 may be in a direction away from the seatback 18.

The seatback 18 may include a seatback frame 56 and a covering 58 supported on the seatback frame 56. The seatback frame 56 may include tubes, beams, etc. Specifically, the seatback frame 56 includes a pair of upright frame members. The upright frame members are elongated, and specifically, are elongated in a generally upright direction when the seatback 18 is in a generally upright position. The upright frame members are spaced from each other, and the seatback frame 56 includes cross-members (not shown) extending between the upright frame members. The seatback frame 56, including the upright frame members, may be of any suitable plastic material, e.g., carbon fiber reinforced plastic (CFRP), glass fiber-reinforced semi-finished thermoplastic composite (organosheet), etc. As another example, some or all components of the seatback frame 56 may be formed of a suitable metal, e.g., steel, aluminum, etc.

The covering 58 may include upholstery and padding. The upholstery may be cloth, leather, faux leather, or any other suitable material. The upholstery may be stitched in panels around the frame. The padding may be between the covering 58 and the seatback frame 56 and may be foam or any other suitable material. The covering 58 conceals the head airbag 24 when the head airbag 24 is in the uninflated position.

An occupant-seating area 22 is defined by the seat bottom 20 and the seatback 18. The occupant may be disposed in the occupant-seating area 22, as shown in the Figures. The occupant-seating area 22 may be on a front side 60 of the seatback 18. The head airbag 24 may extend from the seatback 18 with the occupant-seating area 22 between the head airbag 24 and the seatback 18 to control the kinematics of the occupant.

The vehicle 10 includes at least one head airbag assembly 62. In the example shown in the Figures the vehicle 10 includes two seats 16 and the vehicle 10 includes two head airbag assemblies 62, specifically one head airbag assembly 62 on each seat. In other words, each seat 16 includes the head airbag assembly 62. The head airbag assembly 62 includes the head airbag 24 and an inflator 64 of the head airbag assembly 62. The head airbag assembly 62 may include a housing 66 of the head airbag assembly 62. The inflator 64 of the head airbag assembly 62 inflates the head airbag 24 to an inflated position, as described further below. Each head airbag assembly 62 may be devoted to a single occupant.

The head airbag assembly 62 is mounted to the seatback 18. Specifically, the head airbag 24 is mounted to the seatback 18. For example, the head airbag 24 may be mounted to the seatback frame 56, for example, the cross-member of the seatback frame 56. In the example in which the head airbag assembly 62 includes the housing 66, the housing 66 of the head airbag assembly 62 may be mounted to the seatback frame 56, e.g., with clips, fasteners, etc.

The head airbag 24 is inflatable over the occupant-seating area 22 of the seat. In other words, the head airbag 24 inflates above the head of the occupant and is positioned over the head of the occupant in the inflated position. Specifically, the head airbag 24 may include a top chamber 68. The head airbag 24, e.g., the top chambers 68, is between the occupant-seating area 22 and the roof in the inflated position. Specifically, the top chambers 68 in the inflated position may be between the head of the occupant and the roof.

In addition to extending over the occupant-seating area 22, the head airbag 24 may extend downwardly seat-forward of the occupant-seating area 22. Specifically, the head airbag 24 may extend over the head of the occupant and downward in front of the head of the occupant. In such an example, the head of the occupant is between the seatback 18 and the head airbag 24 in the inflated position. The head airbag 24, e.g., the top panel, may extend downwardly seat-forward of the thorax of the occupant in the seat 16 with the thorax of the occupant between the head airbag 24, e.g., the top panel, and the seatback 18. In the example shown in the Figures, the top chambers 68 extends above the occupant-seating area 22 and seat-forward of the occupant-seating area 22, and specifically above the head of the occupant-seating area 22 and seat-forward of the head and thorax of the occupant.

The head airbag 24 is inflatable downwardly on opposite sides of the occupant-seating area 22. For example, the head airbag 24 may include two side chambers 70 extending downwardly from the top chambers 68 on opposite sides of the occupant-seating area 22 in the inflated position. In such examples, the top chambers 68 and the side chambers 70 each have inflation chambers. The inflation chambers of the top chambers 68 and the side chambers 70 may be in fluid communication with each other or fluidly isolated from each other.

As set forth above, in examples including the top chambers 68 and side chambers 70, the top chambers 68 is above the occupant-seating area 22 and the side chambers 70 are on opposite sides of the occupant-seating area 22 in the inflated position. Accordingly, an occupant in the occupant-seating area 22 is enclosed by the seatback 18, the top chambers 68, and the side chambers 70 when the head airbag 24 is in the inflated position.

The head airbag may include any suitable number of chambers in addition to or in the alternative to the top chamber and the side chambers. The head airbag assembly may include tethers. The head airbag assembly may be, for example, the inflatable assembly disclosed in U.S. Pat. No. 10,625,704, which is incorporated herein by reference.

As set forth above, the two side chambers 70 are inflatable downwardly from the top chambers 68 on opposite sides of the occupant-seating area 22. In other words, the occupant-seating area 22 is between the side chambers 70 when the airbag is inflated. Accordingly, the side chambers 70 are on opposite sides of the occupant in the occupant-seating area 22.

The head airbag 24, e.g., the top chambers 68, the side chambers 70, etc., may be fabric, e.g., a woven polymer. As an example, the head airbag 24 may be woven nylon yarn, for example, nylon 6, 6. Other examples of woven polymer may include a coating, such as silicone, neoprene, urethane, etc. For example, the coating may be polyorgano siloxane.

The inflator 64 of the head airbag assembly 62 is supported on the seatback 18 and is in fluid communication with the head airbag 24. Specifically, the inflator is in fluid communication with the top chambers 68 and the side chambers 70. The inflator 64 of the head airbag assembly 62 expands the head airbag 24 with inflation medium, such as a gas, to move the head airbag 24 from the uninflated position to the inflated position. The inflator 64 of the head airbag assembly 62 may be supported by any suitable component. For example, in examples in which the head airbag assembly 62 includes the housing 66, the inflator 64 of the head airbag assembly 62 may be supported by the housing 66 of the head airbag assembly 62. The inflator 64 of the head airbag assembly 62 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 64 of the head airbag assembly 62 may be connected to the head airbag 24 through fill tubes, diffusers, etc. The inflator 64 of the head airbag assembly 62 may be separately connected to the top chambers 68 and each of the side chambers 70. For example, the inflator 64 of the head airbag assembly 62 may include a fill tube for each of the side chambers 70 and the top chambers 68, respectively.

The vehicle 10 includes at least one knee airbag assembly 46. The knee airbag assembly 62 includes the knee airbag 26 and an inflator 72 of the knee airbag assembly 46. The knee airbag assembly 46 may include a housing 74 of the knee airbag assembly 46. The inflator 72 of the knee airbag assembly 46 inflates the knee airbag 26 to an inflated position, as described further below.

In the example shown in the Figures, the vehicle 10 includes two knee airbag assemblies 46. Specifically, in the example shown in FIGS. 1-5, the vehicle 10 includes two seats 16 and the vehicle 10 includes two knee airbag assemblies 46 between the seats 16 with one of the knee airbag assemblies 46 paired with one of the seats 16 and the other of the knee airbag assemblies 46 paired with the other of the seats 16. Specifically one of the knee airbag assemblies 46 controls the kinematics of the occupant of one of the seats 16 and the other of the knee airbag assemblies 46 controls the kinematics of the occupant of the other of the seats 16. As another example, in the example shown in FIG. 6, the vehicle 10 includes one knee airbag assembly 46 between the two seats 16 designed to control the kinematics of occupants of both seats 16. Specifically, the knee airbag 26 in the example of FIG. 6 includes two lobes 76 with one of the lobes 76 paired with one of the seats 16 and with the other of the lobes 76 paired with the other of the seats 16. One of the lobes 76 is designed to control the kinematics of the occupant of one of the seats 16 and the other of the lobes 76 is designed to control the kinematics of the occupant of the other of the seats 16.

In the example shown in FIGS. 1-5, the two knee airbag assemblies 46 may be identical. For example, each knee airbag assembly 46 may include the housing 74 mounted to the body side 14, as described further below, and the knee airbag 26 supported by the housing 74 in the uninflated position and the inflated position. In the example in FIGS. 1-5, the two knee airbag assemblies 46 may each include its own inflator 72, i.e., one inflator 72 for one of the knee airbag assemblies 46 and another inflator 72 for the other of the knee airbag assemblies 46. In such an example, the inflator 72 may be in and/or on the housing 74 of the respective knee airbag assembly 46. As another example, the two knee airbag assemblies 46 in FIGS. 1-5 may share a common inflator 72. In such an example, one inflator 72 may inflate the knee airbags 26 of both of the knee airbag assemblies 46. In such an example, the inflator 72 may be in or on the housing 74 of either of the knee airbags assemblies 46 or may be remote from both knee airbags 26. In either example, the inflator 72 may be in fluid communication with the knee airbags 26 through diffusers, fill tubes, etc. As described further below, the two airbag assemblies may be independently activated, e.g., based on seat occupancy.

Figure 6:
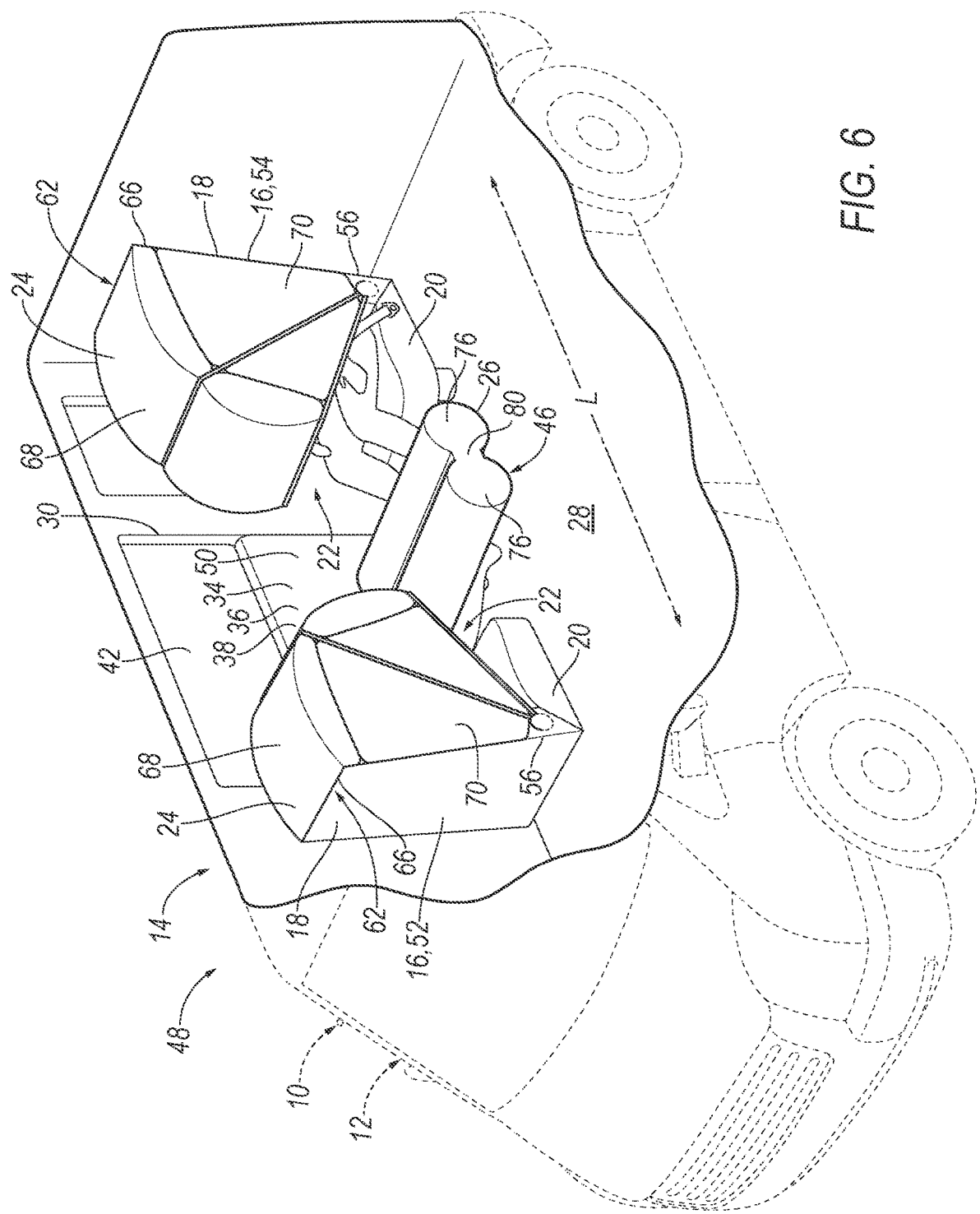
FIG. 6 is a cut-away perspective view of the vehicle with the head airbag assembly of two seats in the inflated position and another example of a knee airbag in the inflated position.
Figure 7:
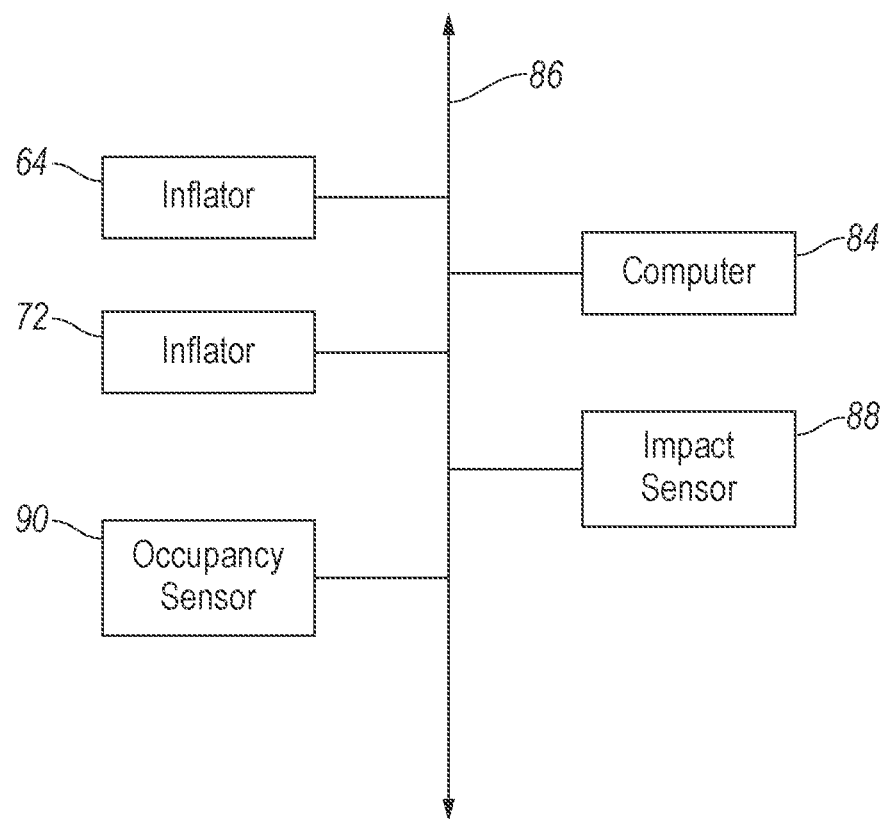
FIG. 7 is a block diagram of a system of the vehicle.

In the example shown in FIG. 6, the knee airbag assembly 46 includes one knee airbag 26 that includes two lobes 76. One of the lobes 76 in the inflated position is adjacent the seat bottom 20 of one of the seats 16 and controls the kinematics of the occupant of that seat 16 and the other lobe 76 in the inflated position is adjacent the seat bottom 20 of the other of the seats 16 and controls the kinematics of the occupant of that seat 16.

The two lobes 76 may be in fluid communication with each other. The two lobes 76 may share a common inflation chamber that is filled with inflation medium from the inflator 72. In such an example, the inflator 72 of the knee airbag assembly 46 in FIG. 6 inflates both lobes 76. As an example, the inflator 72 may be in or on the housing 74 of the knee airbag assembly 46.

With continued reference to FIG. 6, the knee airbag 26 may include a hub 80 between the two lobes 76. Both lobes 76 may be in fluid communication with the hub 80. The two lobes 76 and the hub 80 may share a common inflation chamber that is filled with inflation medium from the inflator 72. In such an example, the inflator 72 of the knee airbag assembly 46 in FIG. 6 inflates both lobes 76 and the hub 80. In the inflated position, the lobes 76 may have a larger cross-section than the hub 80 taken in a plane parallel to the vehicle-longitudinal centerline L. The knee airbag 26 may include internal tethers (not shown) to maintain the shape and size of the lobes 76 and the hub 80 in the inflated position as shown in FIG. 6.

The knee airbag 26 in the inflated position is adjacent the seat bottom 20 in the seat-forward direction of the seat bottom 20. Specifically, the knee airbag 26 in the inflated position is positioned horizontally to control the kinematics of the legs of the occupant on the seat bottom 20. The knee airbag 26, for example, may be horizontally aligned with the seat bottom 20, i.e., a horizontal plane extends through both the seat bottom 20 and the knee airbag 26 in the inflated position. The legs of the occupant are directly between the seat bottom 20 and the knee airbag 26 in the inflated position with nothing between the legs of the occupant and the seat bottom 20 and with nothing between the legs of the occupant and the knee airbag 26 in the inflated position.

In the example shown in FIGS. 1-5, one of the knee airbags 26 in the inflated position is adjacent the seat bottom 20 of one of the seats 16 seat-forward of that seat bottom 20, and the other of the knee airbags 26 in the inflated position is adjacent the seat bottom 20 of the other of the seats 16 seat-forward of that seat bottom 20. In the example shown in FIG. 6, the knee airbag 26 in the inflated position is adjacent the seat bottoms 20 of both seats 16 and is seat-forward of the seat bottoms 20 of both seats 16. Specifically, one of the lobes 76 of the airbag in the inflated position is adjacent the seat bottom 20 of one of the seats 16 and the other of the lobes 76 of the airbag in the inflated position is adjacent the seat bottom 20 of the other of the seats 16.

Figure 4:
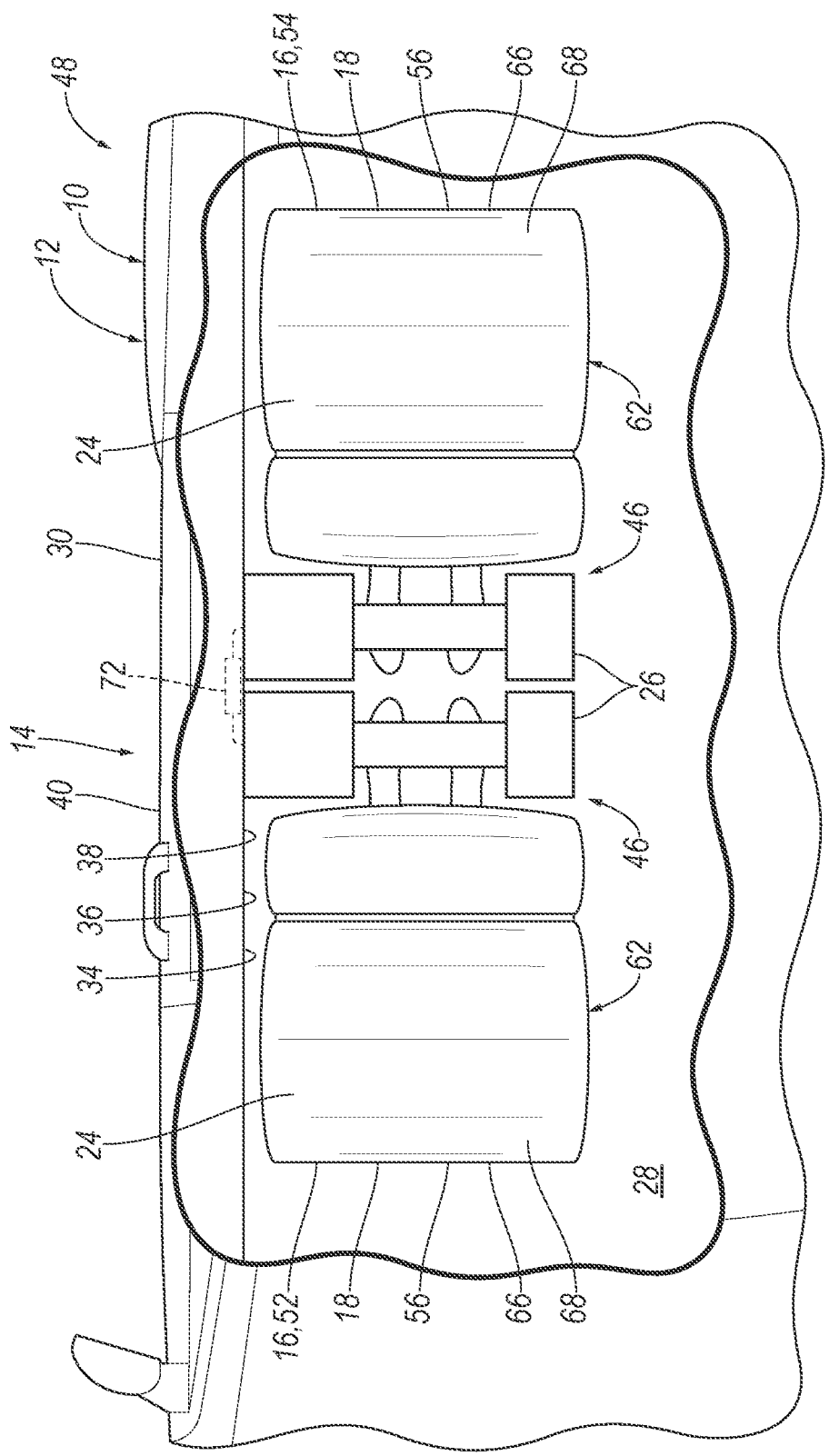
FIG. 4 is a cut-away top view a portion of the vehicle in the configuration shown in FIG. 3.
Figure 5:
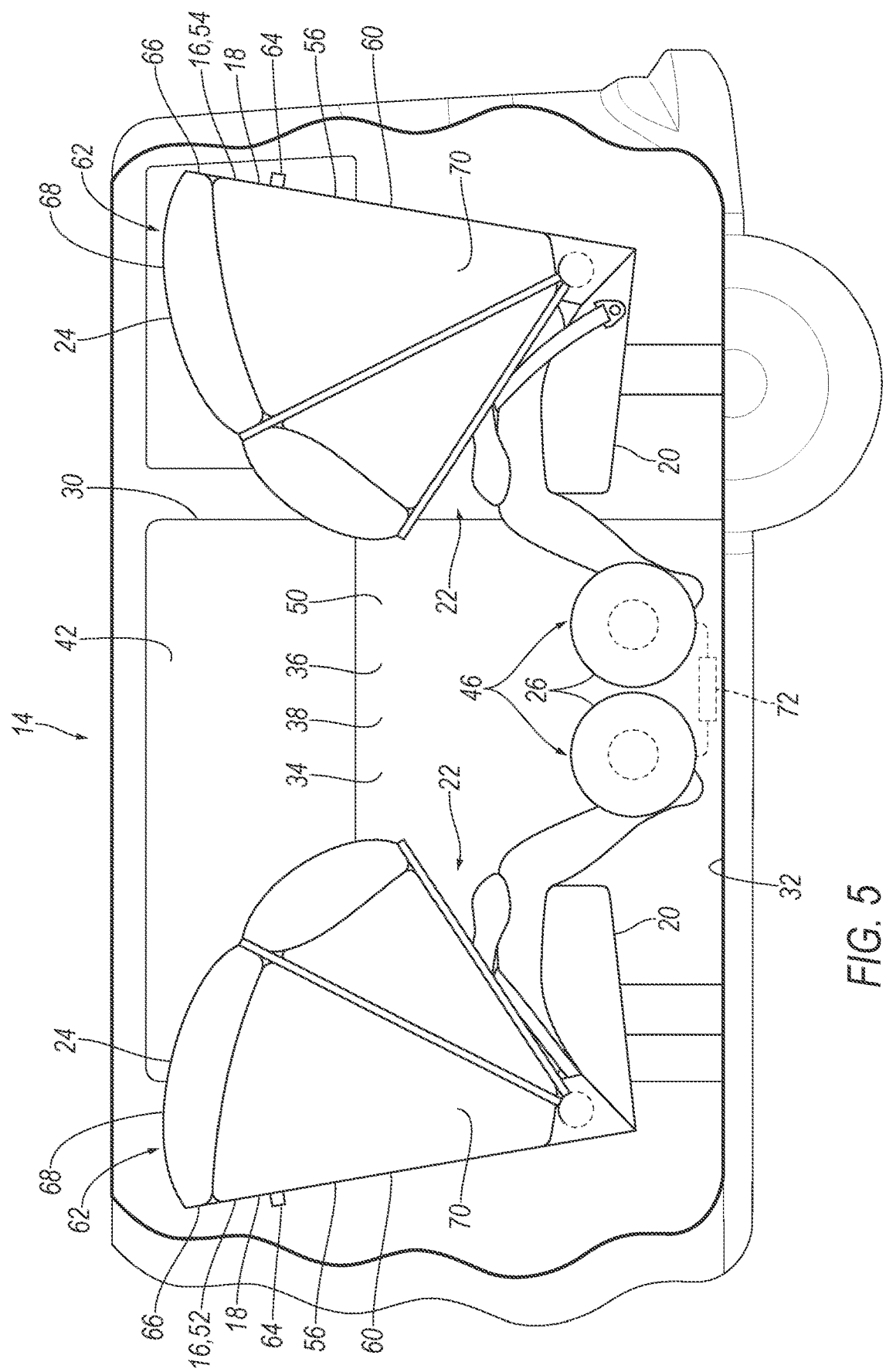
FIG. 5 is a cut-away side view of the vehicle in the configuration shown in FIG. 2.

The knee airbag 26 in the inflated position controls the kinematics of the occupant of the seat 16 that the knee airbag 26 is adjacent as described above. Specifically, the knee airbag 26 controls the kinematics of the legs of the occupant, as shown in FIGS. 2-6. As set forth above, the head airbag 24 also controls the kinematics of the occupant. With continued reference to the example in FIGS. 2-5, the knee airbag 26 adjacent the seat 16 and the head airbag 24 on that seat, in conjunction, controls the kinematics of the occupant of the seat 16 including the legs, torso, and head. As shown in FIGS. 3-5, the knee airbag 26 and the head airbag 24 for the respective seat 16 controls the kinematics of the occupant of that seat 16 and can lower the likelihood of leg kick-up of the occupant of that seat. In examples in which both seats 16 are occupied by occupants, as shown in FIGS. 3-5, this lowers the likelihood of legs of one of the occupants from impacting the legs of the other occupant.

With reference to the example airbag shown in FIG. 6, the knee airbag 26 controls the kinematics of the occupant of both seats 16 to which the knee airbag 26 is adjacent. Specifically, the knee airbag 26 adjacent the seat 16 and the head airbag 24 on that seat, in conjunction, controls the kinematics of the occupant of the seat 16 including the legs, torso, and head. As shown in FIGS. 6, the head airbag 24 for the respective seat 16 and the knee airbag 26 controls the kinematics of the occupant of that seat 16 and can lower the likelihood of leg kick-up of the occupant of that seat. In examples in which both seats 16 are occupied by occupants, as shown in FIGS. 3-5, this lowers the likelihood of legs of one of the occupants from impacting the legs of the other occupant.

As set forth above, the knee airbag 26 is inflatable to an inflated position. Specifically, the knee airbag 26 is inflatable from the body side 14 to the inflated position. Specifically, the knee airbag assembly 46, including the knee airbag 26, is mounted to the body side 14. In the example shown in the Figures, the knee airbag assembly 46 is mounted to the door 30. In such an example, the knee airbag 26 is supported by the door 30 and moves with the door 30 between the open and closed position. As an example, the knee airbag assembly 46 (e.g., the housing 74, knee airbag 26 and/or inflator 72) may be fixed directly to the door panel 34, e.g., the door inner 38, with fasteners, clips, brackets, etc. In the uninflated position, the airbag may be between the door trim panel 36 and the door panel 34 below the window opening 42. In the uninflated position, the knee airbag 26 may be rolled and/or folded on the body side 14.

With reference to FIGS. 2-6, the knee airbag 26 defines an inflation chamber that is inflatable to the inflated position by the inflator 72 of the knee airbag assembly 46. The inflation chamber of the knee airbag 26 may be continuous, i.e., all parts of the inflation chamber are in fluid communication with each other for communication of inflation medium throughout the inflation chamber of the knee airbag 26 for inflation to the inflated position. The airbag may include internal tethers, include baffles, internal vents, etc., for control of inflation characteristics and shape of the knee airbag 26 to the inflated position. The inflation chamber of the knee airbag 26 expands in the inflated position, i.e., the inflation chamber of the knee airbag 26 is between at least two sheets, e.g., fabric sheets of the knee airbag 26, that are expanded away from each other as the inflation chamber is filled with inflation medium.

The door trim panel 36 may include a tear seam (not numbered) to allow the knee airbag 26 to inflate to the inflated position. For example, the door trim panel 36 may include a tear seam extending along the vehicle-longitudinal direction adjacent to the knee airbag assembly 46. As the inflation chambers inflate to the inflated position, the tear seam may release to allow the inflation chambers to extend from between the door panels 34 and the door trim panel 36 to the inflated position.

The knee airbag 26 may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

The vehicle 10 includes a computer 84 that includes the processor and the memory such as are known. The memory includes one or more forms of computer 84 readable media, and stores instructions executable by the computer 84 for performing various operations, including as disclosed herein. The computer 84 may include programming to operate one or more of vehicle brakes, propulsion (e.g., control of acceleration in the vehicle 10 by controlling one or more of an internal combustion engine, electric motor, hybrid engine, etc.), steering, climate control, interior and/or exterior lights, etc., as well as to determine whether and when the computer 84, as opposed to a human operator, is to control such operations. Additionally, the computer 84 may be programmed to determine whether and when a human operator is to control such operations.

The computer 84 may include or be communicatively coupled to, e.g., via a vehicle network such as a communications bus as described further below, more than one processor, e.g., included in components such as sensors, electronic controller units (ECUs) or the like included in the vehicle 10 for monitoring and/or controlling various vehicle components, e.g., a powertrain controller, a brake controller, a steering controller, etc.

The vehicle 10 may include the computer 84 having a processor and a memory storing instructions executable by the processor to deploy the airbags 24, 26. The computer 84 may be, for example, a restraints control module. Use of "in response to," "based on," and "upon determining" herein indicates a causal relationship, not merely a temporal relationship.

The vehicle 10 may include at least one impact sensor 88 for sensing certain impacts of the vehicle 10. The impact sensor 88 is in communication with the computer 84. The computer 84 may activate the inflator 64, 72, e.g., provide an impulse to a pyrotechnic charge of the inflator 64, 72 when the impact sensor 88 senses certain impacts of the vehicle 10. Alternatively or additionally to sensing certain impacts, the impact sensor 88 may be configured to sense certain impacts prior to impact, i.e., pre-impact sensing. The impact sensor 88 is configured to detect certain impacts to the vehicle 10. The impact sensor 88 may be of any suitable type, for example, post-contact sensors such as accelerometers, pressure sensors, and contact switches; and pre-impact sensors 88 such as radar, LIDAR, and vision-sensing systems. The vision-sensing systems may include one or more cameras, CCD image sensors, CMOS image sensors, etc. The impact sensor 88 may be located at numerous points in or on the vehicle 10.

The computer 84 in the figures illustrates an example storage medium. Storage medium may be any non-transitory computer-readable storage medium or machine-readable storage medium, such as an optical, magnetic or semiconductor storage medium. In various implementations, storage medium may be an article of manufacture. In some implementations, storage medium may store computer-executable instructions, such as computer-executable instructions to implement logic flow. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

The vehicle 10 includes a communication network 86 that can include a bus in the vehicle 10 such as a controller area network (CAN) or the like, and/or other wired and/or wireless mechanisms. Via the vehicle network, the computer 84 may transmit messages to various devices in the vehicle 10 and/or receive messages (e.g., CAN messages) from the various devices, e.g., sensors, an actuator, a human machine interface (HMI), etc. Alternatively or additionally, in cases where the computer 84 actually comprises a plurality of devices, the vehicle communication network 86 may be used for communications between devices represented as the computer 84 in this disclosure. Further, as mentioned below, various controllers and/or sensors may provide data to the computer 84 via the vehicle communication network 86.

The vehicle 10 may include seat orientation sensors to determine the orientation of the seat 16 and/or seats 16, i.e., the seat orientation sensors may identify a rotational position of the seat, i.e., whether the seats 16 are in the forward-facing position or the rearward-facing position, and a longitudinal position of the seat, i.e., the location of the seat 16 along the vehicle-longitudinal direction L. The seat orientation sensors may be in communication with the computer 84. The seat orientation sensors may send a signal to the computer 84 to identify the rotational position and the longitudinal position of the seat. The vehicle 10 may include any suitable number of seat orientation sensors to determine the orientation of multiple seats 16 in the vehicle 10. In other words, the vehicle 10 may include a number of seat orientation sensors equal to the number of seats 16 that are rotatable in the vehicle 10. The vehicle 10 may include separate sensors for identification of the rotational position of the seat 16 and identification of the longitudinal position of the seat 16.

The vehicle 10 may include an occupancy sensor 90 for determining whether an occupant is seated in the seat. The occupancy sensor 90 may be configured to at least detect occupancy of the seat. The occupancy sensor 90 may be visible-light or infrared cameras directed at the seat, pressure sensors inside the seat, sensors detecting whether a seatbelt for the seat buckled, or other suitable sensor. The occupancy sensor 90 is in communication with the computer 84 via the communications network 86.

The computer 84 may be programmed to deploy the airbag 24, 26, i.e., activate the inflator 64, 72, in response to certain vehicle impacts detected by the impact sensor 88, occupancy of the seat 16 detected by the occupancy sensor 90, and/or direction of the seat 16 detected by the seat orientation sensor. Accordingly, in examples in which the vehicle 10 includes multiple seats 16 and associated knee airbag assemblies 46 and head airbag assemblies 62, in response to certain vehicle impacts, the computer 84 may inflate only the knee airbag 26 and/or head airbag 24 associated with seats 16 that are occupied and facing in a predetermined orientation. The computer 84 may independently control the inflation the head airbag 24 and/or the knee airbag 26 for any one of the seats 16 based on vehicle-impact type, seat 16 occupancy, seat 16 orientation. In other words, the computer 84 may select inflation of one or both of the knee airbag 26 and the head airbag 24 based on these factors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a vehicle body having a body side;
   a first seat adjacent the body side and including a seatback and a seat bottom extending in a seat-forward direction from the seatback of the first seat;
   the seatback and seat bottom of the first seat defining an occupant-seating area;
   a second seat including a seat bottom and a seatback extending upwardly from the seat bottom of the second seat;
   a head airbag mounted to the seatback of the first seat and inflatable over the occupant-seating area; and
   a first knee airbag and a second knee airbag each mounted to the body side and inflatable from the body side in a cross-vehicle direction between the first seat and the second seat to an inflated position;
   the first knee airbag being between the second knee airbag and the seat bottom of the first seat in the inflated position, and the second knee airbag being between the first knee airbag and the seat bottom of the second seat in the inflated position;
   the first knee airbag and the second knee airbag in the inflated position extending lower than a bottom end of the seat bottom of the first seat and a bottom end of the seat bottom of the second seat;
   the first knee airbag and the second knee airbag each including a leg-receiving portion and a protrusion extending radially outwardly from the leg-receiving portion, the protrusions of the first knee airbag and the second knee airbag being spaced from the body side by the leg-receiving portions, and the protrusions of the first knee airbag and the second knee airbag being aligned with each other along the cross-vehicle direction.

2. The assembly of claim 1, wherein the body side includes a door, the first knee airbag being mounted to the door.

3. The assembly of claim 2, wherein the body side includes a door opening frame and the door slides relative to the door opening frame between an open position and a closed position.

4. The assembly of claim 1, wherein the head airbag includes a top chamber inflatable above the occupant-seating area.

5. The assembly of claim 4, wherein the head airbag mounted to the seatback includes two side chambers inflatable downwardly from the top chamber on opposite sides of the occupant-seating area.

6. The assembly as set forth in claim 1, wherein the vehicle body includes a longitudinal centerline, the first seat and the second seat being between the longitudinal centerline and the body side.

7. The assembly as set forth in claim 6, wherein the first seat and the second seat include vehicle-inboard sides adjacent the longitudinal centerline, the protrusions of the first knee airbag and the second knee airbag being aligned along the cross-vehicle direction with the vehicle-inboard sides of the first seat and the second seat.

8. The assembly of claim 1, further comprising a second head airbag mounted to the seatback of the second seat and inflatable over an occupant-seating area of the second seat.

9. The assembly of claim 8, wherein the head airbag includes a top chamber inflatable above the occupant-seating area of the first seat and the second head airbag includes a top chamber inflatable above the occupant-seating area of the second seat.

10. The assembly of claim 9, wherein the head airbag includes two side chambers inflatable downwardly from the top chamber of the head airbag on opposite sides of the occupant-seating area of the first seat and the second head airbag includes two side chambers inflatable downwardly from the top chamber of the second head airbag on opposite sides of the occupant-seating area of the second seat.

11. An assembly comprising:
a vehicle body having a body side;
a first seat and a second seat adjacent the body side, one of the first seat and the second seat being vehicle-forward of the other of the first seat and the second seat;
the first seat and the second seat each including a seat bottom, a seatback extending upwardly from the seat bottom, and an occupant-seating area defined by the seat bottom and the seatback;
a head airbag mounted to the seatback of the first seat and inflatable over the occupant-seating area of the first seat; and
a knee airbag mounted to the body side and inflatable from the body side to an inflated position, the knee airbag in the inflated position being between the seat bottom of the first seat and the seat bottom of the second seat;
the knee airbag in the inflated position having two lobes, one of the lobes being adjacent the seat bottom of the first seat and the other of the lobes being adjacent the seat bottom of the second seat;
the knee airbag including a hub between the two lobes, the two lobes and the hub sharing a common inflation chamber; and
the lobes having a larger cross-section than the hub in a plane parallel to a cross-vehicle direction.

12. The assembly of claim 11, further comprising a second head airbag mounted to the seatback of the second seat and inflatable over an occupant-seating area of the second seat.

13. The assembly of claim 12, wherein the head airbag includes a top chamber inflatable above the occupant-seating area of the first seat and the second head airbag includes a top chamber inflatable above the occupant-seating area of the second seat.

14. The assembly of claim 13, wherein the head airbag includes two side chambers inflatable downwardly from the top chamber of the head airbag on opposite sides of the occupant-seating area of the first seat and the second head airbag includes two side chambers inflatable downwardly from the top chamber of the second head airbag on opposite sides of the occupant-seating area of the second seat.

* * * * *